United States Patent
Kim et al.

(10) Patent No.: US 9,723,506 B2
(45) Date of Patent: Aug. 1, 2017

(54) METHOD AND APPARATUS FOR REPORTING CHANNEL STATE INFORMATION IN WIRELESS COMMUNICATION SYSTEM

(71) Applicant: LG ELECTRONICS INC., Seoul (KR)

(72) Inventors: Kijun Kim, Anyang-si (KR); Illsoo Sohn, Anyang-si (KR); Jonghyun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 29 days.

(21) Appl. No.: 14/394,213

(22) PCT Filed: Apr. 12, 2013

(86) PCT No.: PCT/KR2013/003081
§ 371 (c)(1),
(2) Date: Oct. 13, 2014

(87) PCT Pub. No.: WO2013/154383
PCT Pub. Date: Oct. 17, 2013

(65) Prior Publication Data
US 2015/0063142 A1    Mar. 5, 2015

Related U.S. Application Data

(60) Provisional application No. 61/623,587, filed on Apr. 13, 2012, provisional application No. 61/635,857, filed on Apr. 19, 2012.

(51) Int. Cl.
*H04W 24/10*    (2009.01)
*H04B 17/309*    (2015.01)
(Continued)

(52) U.S. Cl.
CPC ............ *H04W 24/10* (2013.01); *H04B 7/024* (2013.01); *H04B 7/063* (2013.01); *H04B 7/0617* (2013.01);
(Continued)

(58) Field of Classification Search
CPC .... H04W 24/00; H04L 43/50; H04L 43/0852; H04L 43/08; H04B 17/003
(Continued)

(56) References Cited

U.S. PATENT DOCUMENTS 8,798,011 B2 *  8/2014  Prasad ................. H04B 7/0417
                                                   370/335
9,008,585 B2 *  4/2015  Xiao ................... H04W 72/082
                                                   455/63.1

(Continued)

OTHER PUBLICATIONS

Huawei, et al., "Resources for Interference Measurements," 3GPP TSG RAN WG1 meeting #68bis, R1-120983, Mar. 2012, 9 pages.
(Continued)

*Primary Examiner* — Warner Wong
(74) *Attorney, Agent, or Firm* — Lee Hong Degerman Kang Waimey

(57) ABSTRACT

One embodiment of the present invention relates to a method for a terminal to report channel state information in a wireless communication system, comprising the steps of: calculating one or more pieces of channel quality information from a signal measurement resource configuration and a plurality of interference measurement resource configurations associated with the signal measurement resource configuration; and transmitting a channel state report including the calculated channel quality information.

11 Claims, 13 Drawing Sheets

(51) Int. Cl.
*H04B 7/024* (2017.01)
*H04B 7/06* (2006.01)
*H04L 12/26* (2006.01)
*H04B 17/24* (2015.01)

(52) U.S. Cl.
CPC ......... *H04B 7/0632* (2013.01); *H04B 17/309* (2015.01); *H04B 17/24* (2015.01); *H04L 43/08* (2013.01)

(58) Field of Classification Search
USPC ..................... 370/252, 310–350, 464–465
See application file for complete search history.

(56) References Cited

U.S. PATENT DOCUMENTS

| | | | |
|---|---|---|---|
| 2007/0183303 A1* | 8/2007 | Pi | H04L 1/0026 370/206 |
| 2010/0254355 A1* | 10/2010 | Abraham | H04W 64/00 370/335 |
| 2012/0021926 A1* | 1/2012 | Thomas | G01N 33/542 506/7 |
| 2012/0140708 A1* | 6/2012 | Choudhury | H04W 72/082 370/328 |
| 2013/0102304 A1* | 4/2013 | Lee | H04W 24/00 455/422.1 |
| 2013/0258886 A1* | 10/2013 | Chen | H04B 7/0417 370/252 |
| 2013/0258973 A1* | 10/2013 | Khoshnevis | H04W 72/1226 370/329 |
| 2013/0258976 A1* | 10/2013 | Nagata | H04W 24/10 370/329 |
| 2013/0286866 A1* | 10/2013 | Hammarwall | H04B 7/024 370/252 |
| 2013/0336214 A1* | 12/2013 | Sayana | H04B 7/024 370/328 |
| 2014/0003240 A1* | 1/2014 | Chen | H04W 28/08 370/235 |
| 2014/0036706 A1* | 2/2014 | Mondal | H04W 24/08 370/252 |
| 2014/0036796 A1* | 2/2014 | Etemad | H04W 24/04 370/329 |
| 2014/0086084 A1* | 3/2014 | Bi | H04L 1/0026 370/252 |
| 2014/0112173 A1* | 4/2014 | Hammarwall | H04L 1/0026 370/252 |
| 2014/0369224 A1* | 12/2014 | Nagata | H04L 5/0053 370/252 |
| 2015/0049621 A1* | 2/2015 | Liu | H04L 5/0048 370/252 |
| 2015/0358062 A1* | 12/2015 | Skillermark | H04L 1/0026 370/329 |

OTHER PUBLICATIONS

LG Electronics, "Interference assumption for CoMP CQI calculation," 3GPP TSG RAN WG1 Meeting #68b, R1-121439, Mar. 2012, 4 pages.
Motorola Mobility, "Interference Measurements for Rel-11," 3GPP TSG RAN1 #68bis, R1-121588, Mar. 2012, 3 pages.
Nokia Siemens Networks, et al., "Interference measurement support for Rel-11," 3GPP TSG RAN WG1 Meeting #68, R1-120722, Feb. 2012, 4 pages.
CATT, "Discussion on interference measurement resources," 3GPP TSG RAN WG1 Meeting #68bis, R1-121091, Mar. 2012, 5 pages.
PCT International Application No. PCT/KR2013/003081, Written Opinion of the International Searching Authority dated Jul. 30, 2013, 16 pages.

* cited by examiner

FIG. 1
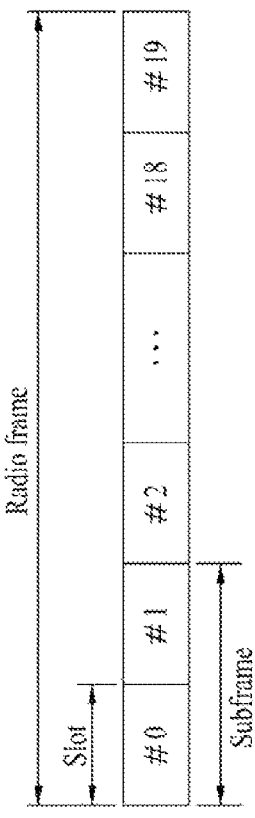
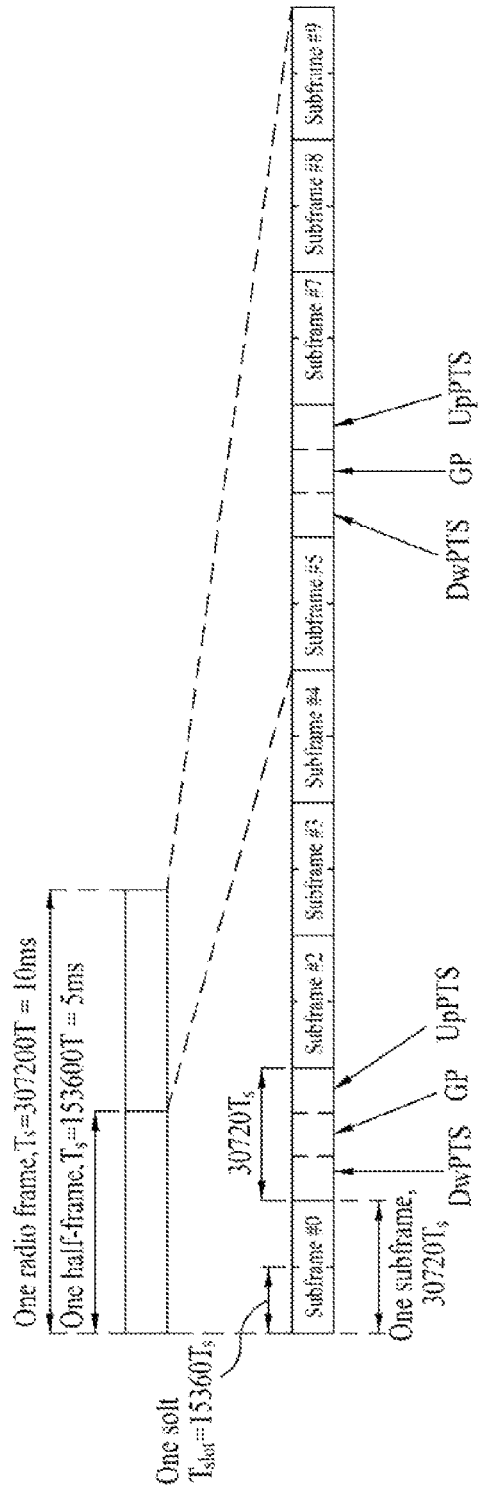

FIG. 5
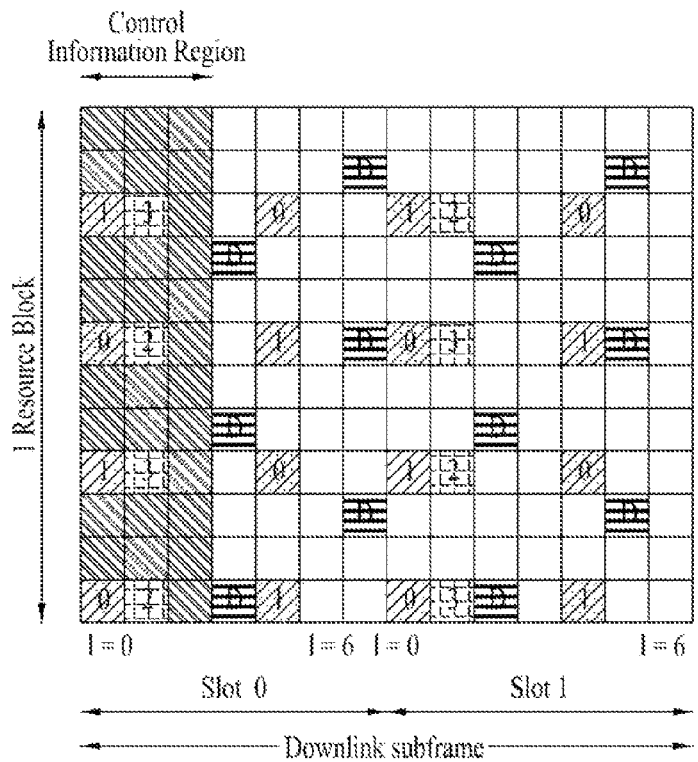
(a)
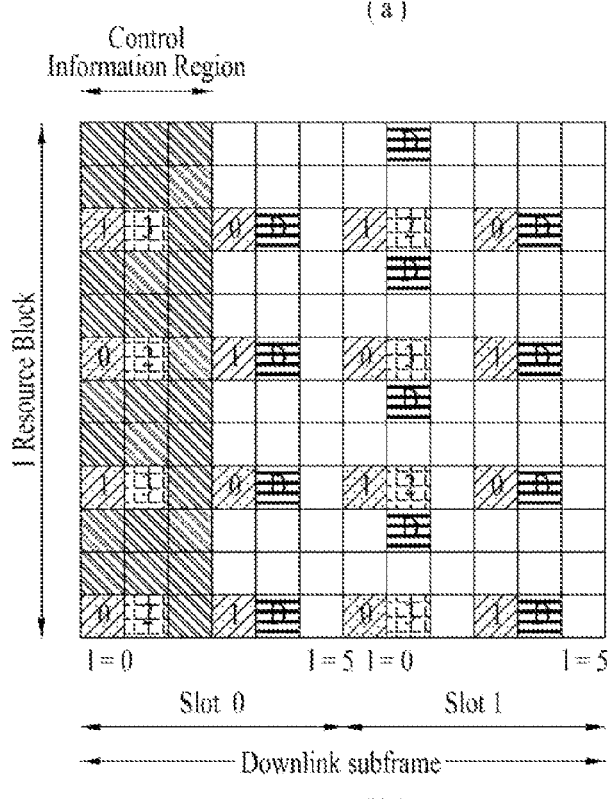
(b)

FIG. 11
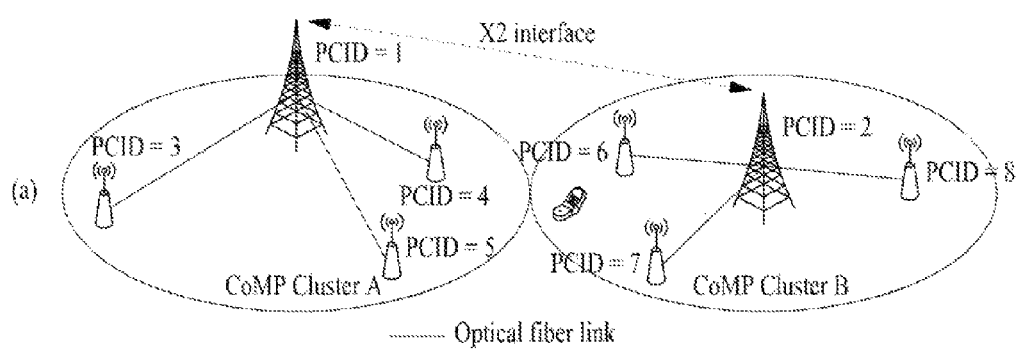
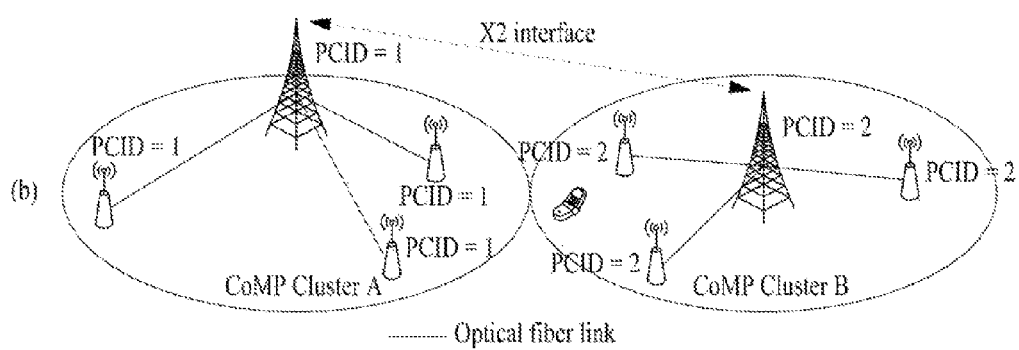

METHOD AND APPARATUS FOR REPORTING CHANNEL STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2013/003081, filed on Apr. 12, 2013, which claims the benefit of U.S. Provisional Application Ser. Nos. 61/623,587, filed on Apr. 13, 2012, and 61/635,857, filed on Apr. 19, 2012, the contents of which are all hereby incorporated by reference herein in their entirety.

TECHNICAL FIELD

The present disclosure relates to a wireless communication system and, more particularly, to a method and apparatus for transmitting channel state information for a coordinated multi-point (CoMP) environment.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmission power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE

Technical Problem

An object of the present invention devised to solve the problem lies in a method and apparatus for reporting channel state information which may reduce the amount of information fed back in a CoMP environment.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

According to a first aspect of the present invention, provided herein is a method for reporting channel state information by a user equipment in a wireless communication system, including calculating at least one channel quality information from a signal measurement resource configuration and a plurality of interference measurement resource configurations associated with the signal measurement resource configuration, and transmitting a channel state report containing the calculated channel quality information.

According to a second aspect of the present invention, provided herein is a user equipment in a wireless communication system, including a receive module, and a processor, wherein the processor calculates at least one channel quality information from a signal measurement resource configuration and a plurality of interference measurement resource configurations associated with the signal measurement resource configuration, and transmits a channel state report containing the calculated channel quality information.

The first and second aspects of the present invention may include the following details.

A combination of the signal measurement resource configuration and the interference measurement resource configurations for calculating the at least one channel quality information may change depending on a rank indicator.

If a rank indicator is greater than 1, each of the at least one channel quality information may be based on the same combination of the signal measurement resource configuration and the interference measurement resource configurations. If the rank indicator is 1, each of the at least one channel quality information may be based on a different combination of the signal measurement resource configuration and the interference measurement resource configurations.

The signal measurement resource configuration and the plurality of interference measurement resource configurations may correspond to one channel state information feedback configuration.

Association between the signal measurement resource configuration and the plurality of interference measurement resource configurations may be used only for the user equipment.

The signal measurement resource configuration may be for transmission of a signal from one of a first transmission point and a second transmission point, the first transmission point and the second transmission point belonging to a coordinated multi point (CoMP) cluster, and the plurality of interference measurement resource configurations may be related to presence or absence of interference from a transmission point of the first transmission point and the second transmission point, the transmission point not transmitting the signal.

Priorities may be set for the plurality of interference measurement resource configurations.

The calculating of the channel quality information may include calculating a rank indicator using the signal measurement resource configuration and an interference measurement resource configuration having highest priority among the interference measurement resource configurations.

If the rank indicator is greater than 1, the user equipment may calculate channel quality information for each codeword from the signal measurement resource configuration and the interference measurement resource configuration having the highest priority.

If the rank indicator is 1, the user equipment may calculate a channel quality information from the signal measurement resource configuration and the interference measurement resource configuration having the highest priority, and calculate a second channel quality information from the signal measurement resource configuration and an interference measurement resource configuration having next highest priority after the interference measurement resource configuration having the highest priority.

The signal measurement resource configuration may be related to a non-zero power channel state information-reference signal (CSI-RS) resource, and the interference measurement resource configurations may be related to a zero power CSI-RS resource.

The signal measurement resource configuration may be a channel state information-reference signal (CSI-RS) resource configuration, and the interference measurement resource configurations may be channel state information-interference measurement (CSI-IM) resource configurations.

Advantageous Effects

According to embodiments of the present invention, channel state reporting proper for a CoMP environment may be performed, while the amount of information fed back is minimized.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIG. 1 illustrates a radio frame structure;

FIG. 5 illustrates a reference signal;

FIG. 11 is a diagram illustrating a coordinated multi-point cluster to which an embodiment of the present invention is applicable;

BEST MODE

Figure 2:
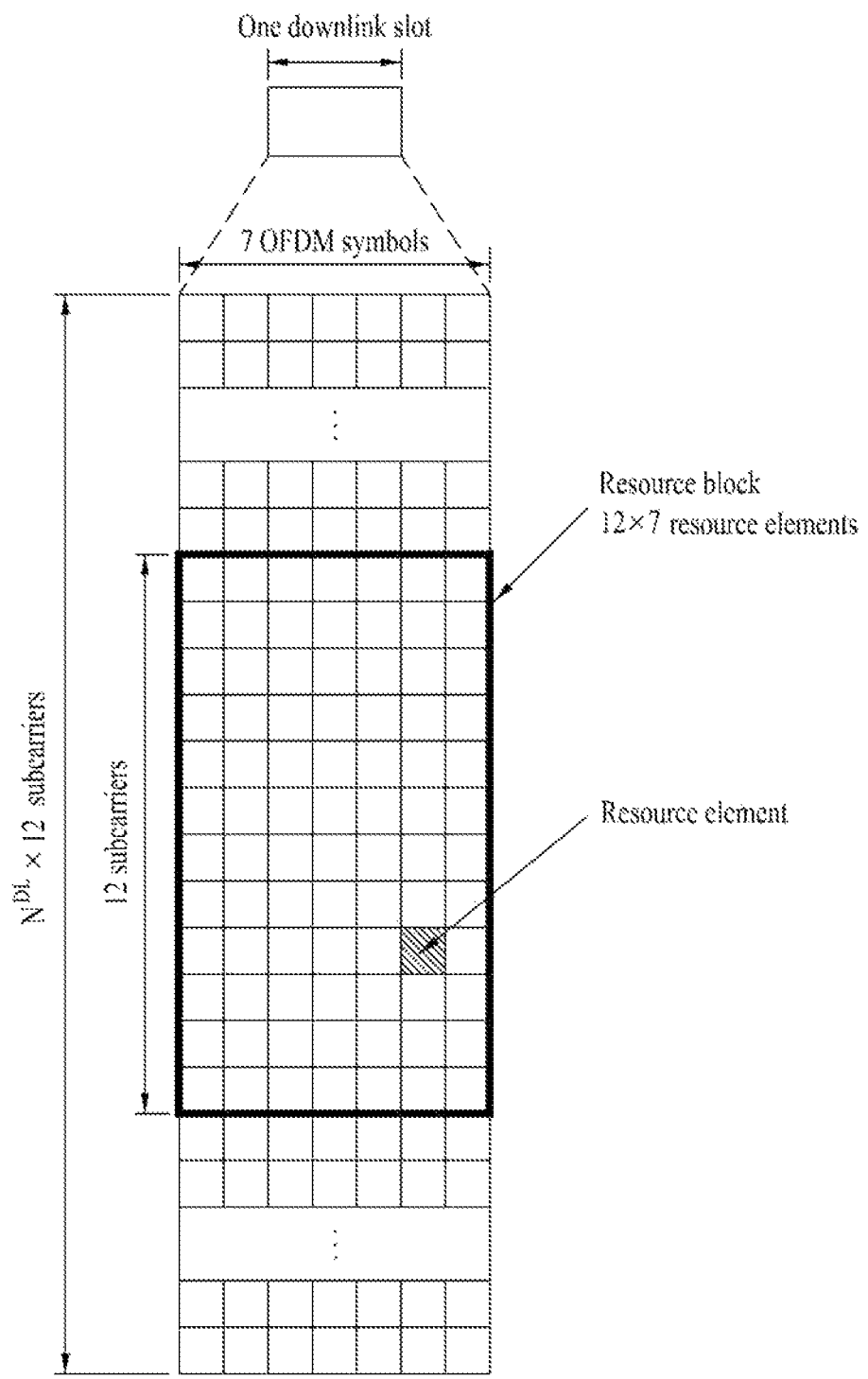
FIG. 2 is a diagram illustrating a resource grid for one downlink (DL) slot.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)". The name "cell" adopted in the following descriptions may be applied to transmission/reception points such as a base station (or eNB), a sector, a remote radio head (RRH), and a relay, and may be used a general term to identify a component carrier at a specific transmission/reception point.

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and IEEE 802.16m advanced (wirelessMAN-OFDMA advanced system). For clarity, the following description focuses on 3GPP LTE and 3GPP LTE-A systems. However, the spirit of the present invention is not limited thereto.

LTE/LET-A Resource Structure/Channel

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The illustrated radio frame structures are merely examples, and various modifications may be made to the number of subframes included in a radio frame, the number of slots included in a subframe, or the number of symbols included in a slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
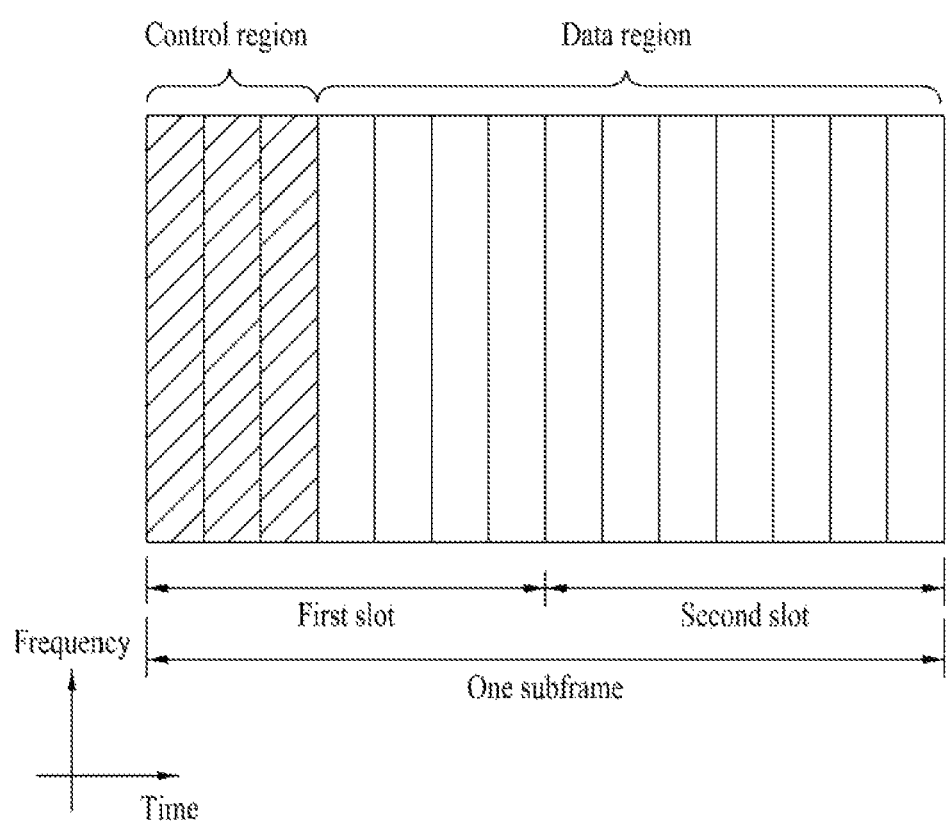
FIG. 3 is a diagram illustrating a DL subframe structure.

FIG. 3 illustrates a DL subframe structure. Up to the first three OFDM symbols of the first slot in a DL subframe are used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about a UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging radio network temporary identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
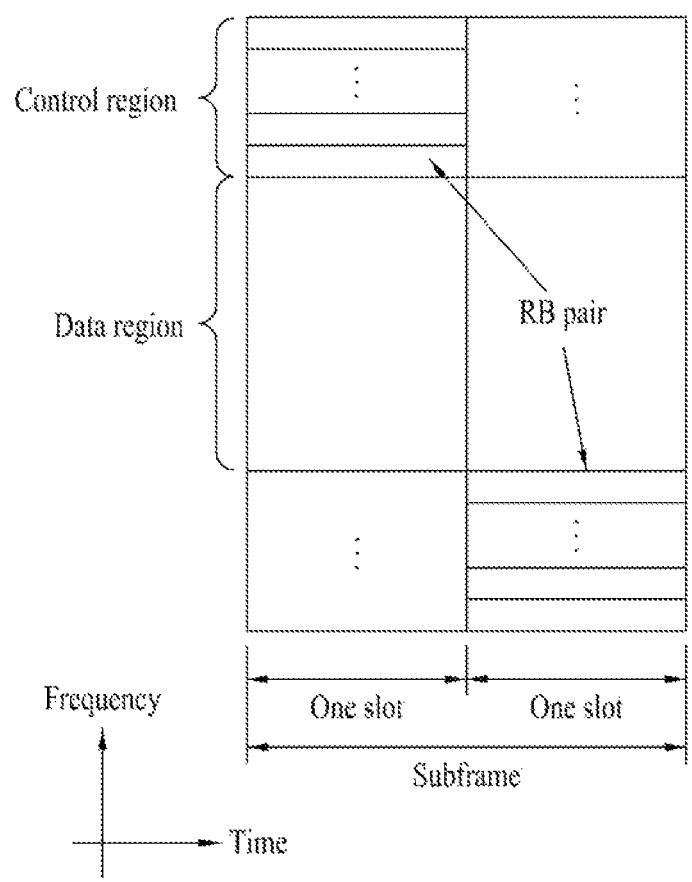
FIG. 4 is a diagram illustrating an uplink (UL) subframe structure.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Reference Signal (RS)

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the degree of distortion of the signal received over the channel is used to detect the channel information. This signal is referred to as a pilot signal or a reference signal.

In the case in which data is transmitted and received using multiple antennas, a channel state between a transmit antenna and a receive antenna needs to be identified to receive a correct signal. Accordingly, a separate RS is needed for each transmit antenna and, more particularly, for each antenna port.

RSs may be divided into an UL RS and a DL RS. In the current LTE system, the UL RSs include:

i) a demodulation-reference signal (DM-RS) for channel estimation for coherent demodulation of information transmitted over a PUSCH and a PUCCH; and ii) a sounding reference signal (SRS) for measuring UL channel quality at frequencies of different networks in the BS.

The DL RSs include:

i) a cell-specific reference signal (CRS) shared by all UEs in a cell;

ii) a UE-specific reference signal for a specific UE;

iii) a demodulation-reference signal (DM-RS) transmitted for coherent demodulation in the case of transmission of a PDSCH;

iv) a channel state information-reference signal (CSI-RS) for delivering channel state information (CSI) in the case of transmission of a DL DMRS;

v) a multimedia broadcast single frequency network (MBSFN) reference signal transmitted for coherent demodulation of a signal transmitted in an MBSFN mode, and vi) a positioning reference signal used to estimate geographic position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for acquisition of channel information and for data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

FIG. 5 is a diagram illustrating a pattern in which CRSs and DRSs defined in a legacy 3GPP LTE system (e.g., Release-8) are mapped to resource block (RB) pairs. A downlink RB pair, as a unit to which an RS is mapped, may be represented as a unit of one subframe in the time domain times 12 subcarriers in the frequency domain. That is, one RB pair has a length of 14 OFDM symbols for a normal CP (FIG. 5(a)) and a length of 12 OFDM symbols for an extended CP (FIG. 5(b)).

FIG. 5 shows locations of RSs on RB pairs in a system in which the BS supports four transmit antennas. In FIG. 5, resource elements (REs) denoted by "0", "1", "2" and "3" represent the locations of the CRSs for antenna port indexes 0, 1, 2 and 3, respectively. In FIG. 5, REs denoted by "D" represent locations of the DMRSs.

Channel State Information-RS (CSI-RS)

The CSI-RS, which is designed for the LTE-A system supporting up to eight antenna ports on downlink, is a reference signal intended for channel measurement. The CSI-RS is different from the CRS which is intended for channel measurement and data demodulation. Accordingly, the CSI-RS does not need to be transmitted in every subframe, unlike the CRS. The CSI-RS is used in transmission mode 9, and the DMRS is transmitted for data demodulation.

More specifically, the CSI-RS may be transmitted through antenna ports 1, 2, 4, and 8. When one antenna port is used, it may be antenna port #15. When two antenna ports are used, they may be antenna ports #15 and #16. When four antenna ports are used, they may be antenna ports #15 to #18. When eight antenna ports are used, they may be antenna ports #15 to #22.

A CSI-RS may be generated using Equation 1 given below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{Equation 1}$$

$$m = 0, 1, \ldots, N_{RB}^{max,DL} - 1$$

Herein, $r_{l,n_s}(m)$ denotes a generated CSI-RS, c(i) denotes a pseudo random sequence, $n_s$ denotes the slot number, l denotes an OFDM symbol, and $N_{RB}^{max,DL}$ denotes the maximum number of RBs of a DL bandwidth.

The CSI-RS generated through Equation 1 may be mapped to an RE for each antenna port, using Equation 2.

$$a_{k,l}^{(p)} = w_{l''} \cdot r_{l,n_s}(m') \quad \text{Equation 2}$$

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

-continued $$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{cyclic cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 2, k' and l' may be determined according to CSI-RS configurations as shown in Table 1.

TABLE 1

|  | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Figures 6, 7:
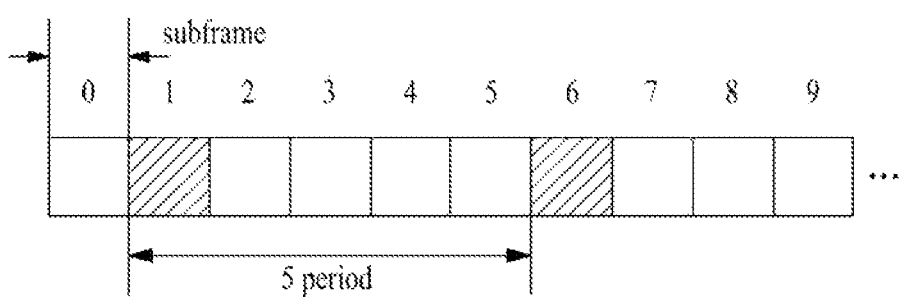
FIG. 6 is a diagram illustrating a channel state information reference signal.
FIGS. 7 to 9 are diagrams illustrating reporting of channel state information.

For a specific CSI-RS according to Equation 2 and Table 1, mapping to REs is performed for each antenna port. FIG. 6 shows mapping of CSI-RSs for each antenna port as described above. In FIG. 6, R0 to R3 respectively represent mapping of CRSs to antenna ports, and the number indications represent mapping of CSI-RSs to antenna ports. For example, REs indicated by numbers 0 and 1 represent mapping of a CSI-RS corresponding to antenna port 0 or 1. In this case, CSI-RSs corresponding to two antenna ports are mapped to the same RE, and may be distinguished by different orthogonal codes.

Next, as described above, the CSI-RS may be transmitted in a specific subframe rather than in every subframe. Specifically, the CSI-RS may refer to CSI-RS subframe configurations as listed in Table 2 given below, and be transmitted in a subframe satisfying Equation 3.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

$$(10n_f + \lfloor n_s/2 \rfloor - \Delta_{CSI-RS}) \bmod T_{CSI-RS} = 0 \quad \text{Equation 3}$$

In Table 2, $T_{CSI-RS}$ denotes the period for transmission of a CSI-RS, $\Delta_{CSI-RS}$ is an offset value, $n_f$ denotes a system frame number, and $n_s$ denotes a slot number.

The CSI-RS may be signaled to a UE as a CSI-RS configuration information element, as shown in Table 3.

TABLE 3

```
CSI-RS-Config-r10 ::=        SEQUENCE {
    csi-RS-r10                   CHOICE {
        release                      NULL,
        setup                        SEQUENCE {
            antennaPortsCount-r10        ENUMERATED {an1, an2, an4, an8},
            resourceConfig-r10           INTEGER (0..31),
            subframeConfig-r10           INTEGER (0..154),
            p-C-r10                          INTEGER (-8..15)
        }
    }                            OPTIONAL,      -- Need ON
    zeroTxPowerCSI-RS-r10    CHOICE {
        release                      NULL,
        setup                        SEQUENCE {
            zeroTxPowerResourceConfigList-r10    BIT STRING (SIZE (16)),
            zeroTxPowerSubframeConfig-r10        INTEGER (0..154)
        }
    }                            OPTIONAL       -- Need ON
}
```

In Table 3, 'antennaPortsCount' carries the number (selected among 1, 2, 4, and 8) of antennas through which the CSI-RS is transmitted, 'resourceConfig' carries an RE in which the CSI-RS is positioned in an RB in time-resource frequency, and 'subframeConfig' carries a subframe in which the CSI-RS is transmitted and a CSI-RS EPRE value for PDSCH EPRE. Additionally, the eNB delivers information about a zero power CSI-RS.

In CSI-RS Config, 'resourceConfig' indicates the position at which the CSI-RS is transmitted. This parameter indicates accurate positions of a symbol and a carrier in an RB according to CSI-RS configuration numbers of Table 1 represented as 0 to 31.

Channel State Information (CSI) Feedback

MIMO schemes may be classified into an open-loop MIMO scheme and a closed-loop MIMO scheme. In the open-loop MIMO scheme, a MIMO transmitter performs MIMO transmission without receiving CSI feedback from a MIMO receiver. In the closed-loop MIMO scheme, the MIMO transmitter receives CSI feedback from the MIMO receiver and then performs MIMO transmission. In the closed-loop MIMO scheme, each of the transmitter and the receiver may perform beamforming based on CSI to achieve a multiplexing gain of MIMO transmit antennas. To allow the receiver (e.g., a UE) to feed back CSI, the transmitter (e.g., an eNB) may allocate a UL control channel or a UL-SCH to the receiver.

The CSI feedback may include a rank indicator (RI), a precoding matrix index (PMI), and a channel quality indicator (CQI).

The RI is information about a channel rank. The channel rank indicates the maximum number of layers (or streams) that may carry different information in the same time-frequency resources. Since the rank is determined mainly according to long-term fading of a channel, the RI may be fed back in a longer period than the PMI and the CQI.

The PMI is information about a precoding matrix used for transmission of a transmitter and has a value reflecting the spatial characteristics of a channel. Precoding refers to mapping transmission layers to transmit antennas. A layer-antenna mapping relationship may be determined according to a precoding matrix. The PMI is the index of an eNB precoding matrix preferred by the UE based on a metric such as signal-to-interference-plus-noise ratio (SINR), etc. In order to reduce the feedback overhead of precoding information, the transmitter and the receiver may pre-share a codebook including multiple precoding matrices and only an index indicating a specific precoding matrix in the codebook may be fed back.

In a system supporting an extended antenna configuration (e.g. an LTE-A system), additional acquisition of multi-user (MU)-MIMO diversity using an MU-MIMO scheme is considered. In the MU-MIMO scheme, when an eNB performs downlink transmission using CSI fed back by one UE among multiple users, it is necessary to prevent interference with other UEs from occurring because there is an interference channel between UEs multiplexed in the antenna domain. Accordingly, CSI of higher accuracy than CSI in a single-user (SU)-MIMO scheme should be fed back in order to correctly perform MU-MIMO operation.

A new CSI feedback scheme may be adopted by modifying conventional CSI including an RI, a PMI, and a CQI so as to more accurately measure and report CSI. For example, precoding information fed back by the receiver may be indicated by a combination of two PMIs. One of the two PMIs (a first PMI) has a long-term and/or wideband property, and may be referred to as W1. The other PMI (a second PMI) has a short-term and/or subband property, and may be referred to as W2. A final PMI may be determined by a combination (or a function) of W1 and W2. For example, if the final PMI is denoted by W, W=W1*W2 or W=W2*W1.

The CQI is information indicating channel quality or channel strength. The CQI may be expressed as an index corresponding to a predetermined modulation and coding scheme (MCS) combination. That is, a CQI index that is fed back indicates a corresponding modulation scheme and code rate. In general, the CQI has a value reflecting a reception SINR that can be achieved when an eNB configures a spatial channel using a PMI.

The CSI feedback scheme is divided into periodic reporting over a physical uplink control channel (PUCCH) and aperiodic reporting over a PUSCH, which is an uplink data channel, according to a request from an eNB.

In aperiodic reporting, reporting is configured for UEs by a request bit contained in the UL scheduling information of the eNB. Upon receiving this information, each UE sends channel information considering a transmission mode thereof to the eNB over the PUSCH. In the case of periodic reporting, a period of transmission of channel information and a corresponding offset are signaled to each UE in each subframe through a higher layer signal, and the channel information considering a transmission mode of each UE is sent to the eNB over the PUCCH according to a defined period. If data is transmitted on uplink in the subframe in which the channel information is transmitted according to the defined period, the channel information may be transmitted along with the data over the uplink data channel (PUSCH) rather than the PUCCH.

The periodic reporting of channel information is described in more detail below. The periodic reporting is divided into four reporting modes according to CQI and PMI feedback types as shown in Table 4 below.

TABLE 4

|  |  | PMI Feedback Type | |
|---|---|---|---|
|  |  | No PMI | Single PMI |
| PUCCH CQI Feedback Type | Wideband (wideband CQI) | Mode 1-0 | Mode 1-1 |
|  | UE Selected (subband CQI) | Mode 2-0 | Mode 2-1 |

The periodic reporting is divided into wideband (WB) CQI and subband (SB) CQI according to CQI feedback types, and is divided into No PMI and single PMI according to whether or not PMI is transmitted. Each UE receives information configured by a combination of a transmission period and an offset through RRC signaling in a higher layer. For example, when the UE receives information containing a combination of a period set to '5' and an offset set to '1', the UE transmits channel information in every five subframes as shown in FIG. 7. In this case, the channel information is transmitted over the PUCCH with a subframe offset placed in the direction in which the subframe index increases from subframe #0. Herein the subframe indexes are combinations of a system frame number ($n_f$) and 20 slot indexes ($n_s$; 0 to 19), and thus may be expressed as $10 \times n_f + \text{floor}(n_s/2)$.

The periodic reporting is divided into one reporting type for transmitting only WB CQI and the other reporting type for transmitting both WB CQI and SB CQI, according to CQI feedback types. In the case of the type for transmitting only the WB CQI, WB CQI information for the entire band is transmitted in subframes corresponding to each CQI transmission period. The transmission period of periodic WB CQI may be set to 2, 5, 10, 16, 20, 32, 40, 64, 80, and 160 ms, or to no transmission. In this case, if PMI needs to be transmitted according to a PMI feedback type in Table 4, PMI information is transmitted together with CQI. In the case of the type for transmitting both WB CQI and SB CQI, WB CQI and SB CQI are alternately transmitted, which will be described with reference to FIG. 8.

Figure 8:
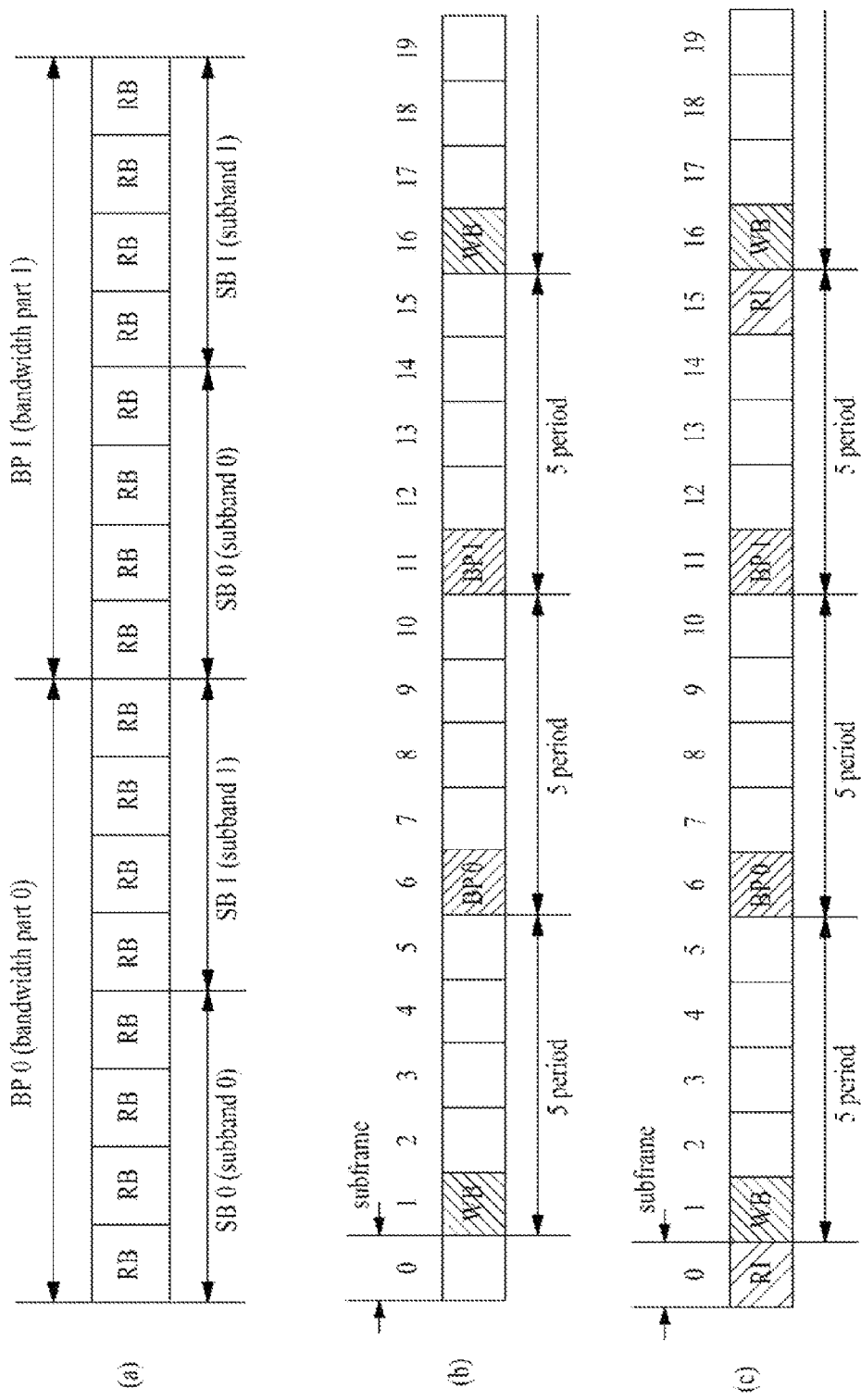

FIG. 8 shows an exemplary system consisting of 16 RBs. The system bandwidth of 16 RBs consists of two bandwidth parts (BPs) (BP0 and BP1), and each BP consists of two subbands (SBs) (SB0 and SB1).

In the case of the type for transmitting both WB CQI and SB CQI, the WB CQI is transmitted in a CQI transmission subframe. In the next transmission subframe, CQI for one SB having a good channel state from among SB0 and SB1 and an index of this SB are transmitted at BP0. In the next transmission subframe, CQI for one SB having a good channel state from among SB0 and SB1 at BP1 and an index of the SB having a good channel state are transmitted. After transmitting the WB CQI, CQI of individual BPs are sequentially transmitted at BP1. In this case, after the WB CQI is transmitted, CQIs for BPs are sequentially transmitted. In this case, the CQIs for BPs located between the WB CQI transmitted and the next WB CQI to be transmitted may be sequentially transmitted one to four times. For example, if the CQI for each BP is transmitted once between two WB CQIs, CQIs are sequentially transmitted in the order of WB CQI, BP0 CQI, BP1 CQI, and WB CQI. In another example, if the CQI about each BP is transmitted four times between the two WB CQIs, CQIs may be transmitted in the order of WB CQI, BP0 CQI, BP1 CQI, BP0 CQI, BP1 CQI, BP0 CQI, BP1 CQI, BP0 CQI, BP1 CQI, and WB CQI. Information about the number of times of sequential transmission is signaled through a higher layer. Regardless of whether the CQI is WB CQI or SB CQI, the information about the number of times of sequential transmission of BP CQI is transmitted over a PUCCH only in a subframe corresponding to the information containing a combination of a period of signaling through the higher layer and an offset. FIG. 8(b) illustrates CQI transmission when information containing a combination of a period set to '5' and an offset set to '1' is signaled to the UE in the case of transmission of both WB CQI and SB CQI. FIG. 8(c) shows RI transmission in addition to CQI transmission of 8(b). In the case of transmission of RI, RI is signaled according to a combination of a transmission period corresponding to a multiple of the WB CQI transmission period and an offset for the transmission period. Herein, the offset is an offset relative to the CQI transmission offset. The offset for RI is defined as 0 or a negative value. For example, if the RI transmission period is one time the WB CQI transmission period, and the offset for RI is '−1', R1 is transmitted in a subframe shown in FIG. 8(c). If the offset for RI is '0' rather than '−1', the transmission subframe of WB CQI overlaps the transmission subframe of RI. In this case, WB CQI is dropped, while RI is transmitted.

In the case of Mode 2-1 in Table 4, two types of periodic reporting may be performed depending on a precoder type indication (PTI) parameter, which is a 1-bit indicator. In this case, W1 and W2 represent the hierarchical codebooks described above. A final precoding matrix W is determined by combining W1 and W2 when W1 and W2 are determined.

More specifically, in the case of Mode 2-1 of periodic reporting, Report 1, Report 2 and Report 3, which correspond to reports of different contents, are transmitted according to different repetition periods. Specifically, in the case of Report 1, RI and a 1-bit PTI value are reported. In the case of Report 2, WB W1 (when PTI=0) or WB W2 and WB CQI (when PTI=1) are reported. In the case of Report 3, WB W2 and WB CQI (when PTI=0), or SB W2 and SB CQI (when PTI=1) are reported.

Report 2 and Report 3 are transmitted in a subframe having an index satisfying $(10 \cdot n_f + \text{floor}(n_s/2) - N_{offset,CQI}) \mod(N_{pd}) = 0$. Herein, $N_{offset,CQI}$ denotes an offset value described above, $N_{pd}$ denotes a subframe interval between Report 2 or Report 3 and neighboring Report 2 or Report 3. Particularly, a subframe whose index satisfies $(10 \cdot n_f + \text{floor}(n_s/2) - N_{offset,CQI}) \mod(H \cdot N_{pd}) = 0$ may be designated as a transmission position of Report 2. In this case, Report 2 is transmitted at every $H \cdot N_{pd}$ interval, and subframes between neighboring Reports 2 are used to transmit Report 3. Herein, H=J·K+1 when PTI=1, and H=M when PTI=0. J is the number of BPs, and K, and M have values determined by higher layer signaling.

Report 1 is transmitted in a subframe whose index satisfies $(10 \cdot n_f + \text{floor}(n_s/2) - N_{offset,CQI} - N_{offset,RI}) \mod(M_{R1} \cdot (J \cdot K +$ 1)·$N_{pd}$)=0. Herein, $M_{R1}$ has a value determined by higher layer signaling, and $N_{offset,RI}$ corresponds to an offset value of Report 1.

Figure 9:
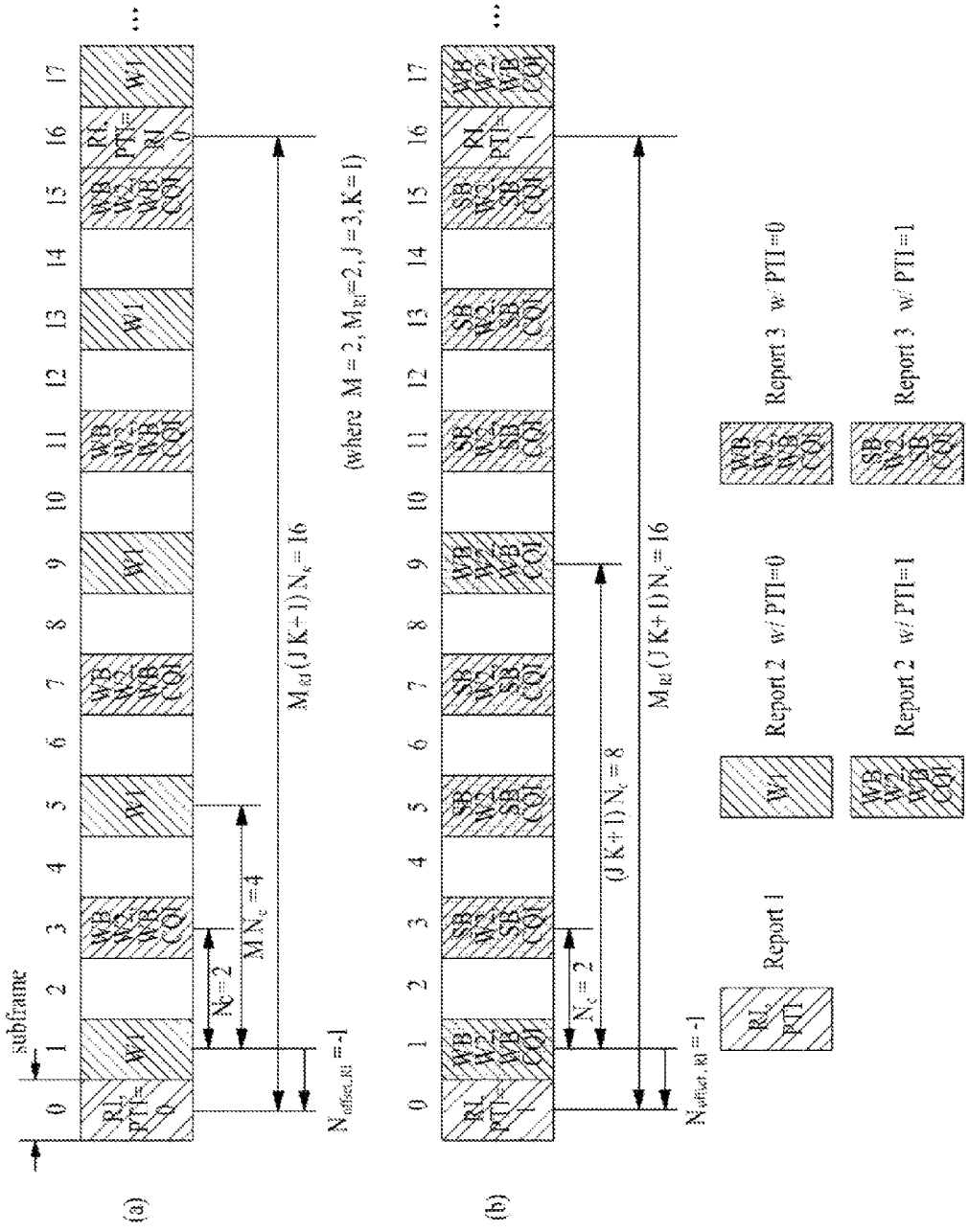

FIG. 9 illustrates two types of periodic reporting according to the aforementioned PTI parameter. Specifically, FIG. 9(a) illustrates a case of PTI=1, and FIG. 9(b) illustrates a case of PTI=0. In FIG. 9, it is assumed that $N_{pd}$=2, $N_{offset,CQI}$=1, M=2, J=3, and K=1. It is also assumed that $M_{RI}$=2, and $N_{offset,RI}$=−1. Thereby, the transmission time of Report 1 does not overlap the transmission time of Report 2. Accordingly, at the time when Report 2 and Report 3 are all transmitted after Report 1 with PTI=0, W1 and W2 are all reported and thus the eNB may recognize final W.

Heterogeneous Deployments

Figure 10:
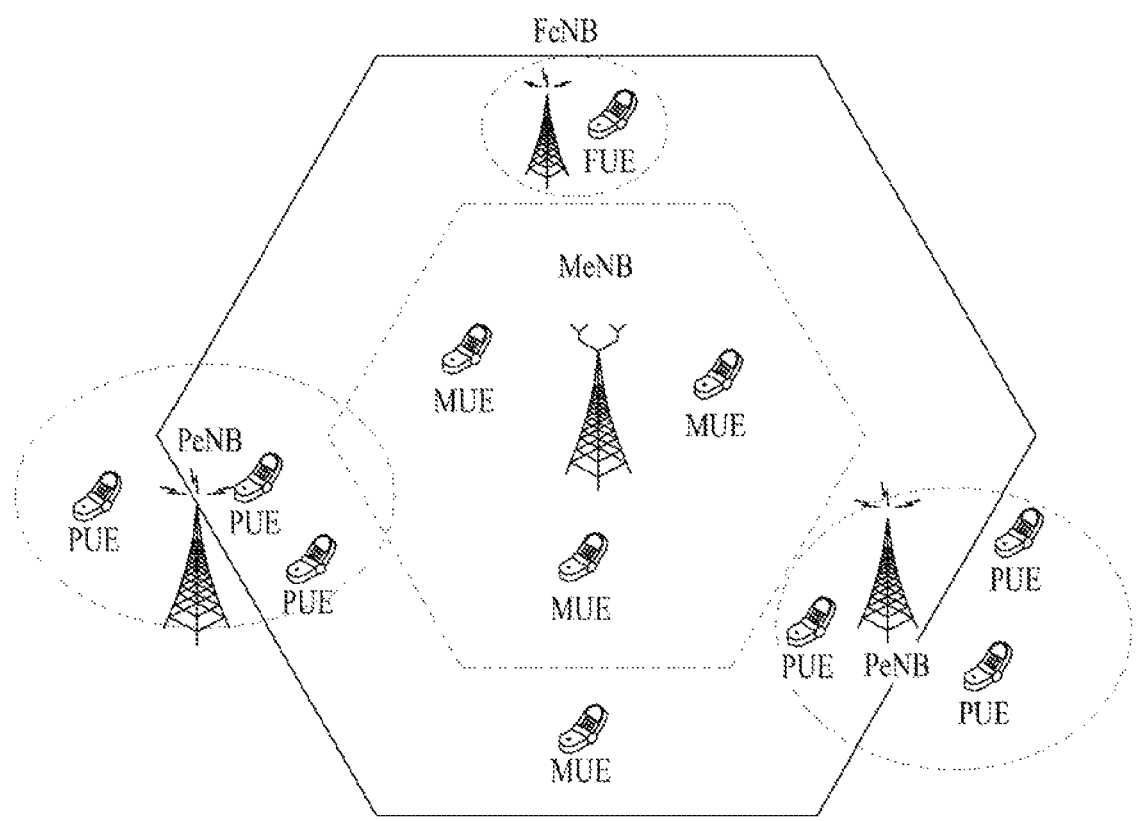
FIG. 10 is a diagram illustrating a heterogeneous network environment.

FIG. 10 illustrates a heterogeneous network wireless communication system including a macro eNB (MeNB) and micro eNBs (PeNBs or FeNBs). The term "heterogeneous network" employed in this specification refers to a network in which an MeNB and a PeNB or FeNB coexist even while they use the same radio access technology (RAT).

The MeNB is a normal eNB of a wireless communication system having wide coverage and high transmission power. The MeNB may be referred to as a macro cell.

The PeNB or FeNB may be referred to as, for example, a micro cell, pico cell, femto cell, home eNB (HeNB), relay, etc. (the exemplified PeNB or FeNB and MeNB may be collectively referred to as transmission points (TPs)). The PeNB or FeNB, a micro version of the MeNB, can independently operate while performing most functions of the MeNB. The PeNB or FeNB is a non-overlay type eNB that may be overlaid in an area covered by the MeNB or in a shadow area that is not covered by the MeNB. The PeNB or FeNB may cover a smaller number of UEs while having a narrower coverage and lower transmission power than the MeNB.

A UE (hereinafter, referred to as a macro-UE (MUE)) may be directly served by the MeNB or a UE (hereinafter, referred to as a micro-UE) may be served by the PeNB or FeNB. In some cases, a PUE present in the coverage of the MeNB may be served by the MeNB.

PeNBs or FeNBs may be classified into two types according to whether UE access is limited.

The first type is an open access subscriber group (OSG) or non-closed access subscriber group (non-CSG) eNB and corresponds to a cell that allows access of the existing MUE or a PUE of a different PeNB. The existing MUE can handover to the OSG type eNB.

The second type is a CSG eNB which does not allow access of the existing MUE or a PUE of a different PeNB. Accordingly, handover to the CSG eNB is impossible.

Coordinated Multi-Point (CoMP)

To satisfy enhanced system performance requirements for the 3GPP LTE-A system, CoMP transmission and reception technology (also called co-MIMO, collaborative MIMO or network MIMO) has been proposed. The CoMP technology may increase the performance of UEs located at a cell edge and the average sector throughput.

In a multi-cell environment with a frequency reuse factor of 1, the performance of a UE located at a cell edge and average sector throughput may be lowered due to inter-cell interference (ICI). To attenuate ICI, the legacy LTE/LTE-A system has adopted a simple passive technique such as fractional frequency reuse (FFR) based on UE-specific power control such that a UE located at a cell edge may have appropriate throughput performance in an environment constrained by interference. However, attenuating the ICI or reusing ICI as a desired signal for the UE may be more desirable than lowering use of frequency resources per cell. To this end, a CoMP transmission technique may be employed.

CoMP schemes applicable to downlink may be broadly classified into joint processing (JP) and coordinated scheduling/beamforming (CS/CB).

According to the JP scheme, data can be used by each transmission point (eNB) of a CoMP cooperation unit. The CoMP cooperation unit refers to a set of eNBs used for a CoMP transmission scheme. The JP scheme may be further divided into joint transmission and dynamic cell selection.

Joint transmission refers to a technique of simultaneously transmitting PDSCHs from a plurality of transmission points (a part or the entirety of a CoMP cooperation unit). That is, a plurality of transmission points may simultaneously transmit data to a single UE. With the joint transmission scheme, the quality of a received signal may be coherently or non-coherently improved, and interference with other UEs may be actively eliminated.

Dynamic cell selection is a technique of transmitting a PDSCH from one transmission point (of a CoMP cooperation unit) at a time. That is, one transmission point transmits data to a single UE at a given time point, while the other transmission points in the CoMP cooperation unit do not transmit data to the UE at the time point. A transmission point to transmit data to a UE may be dynamically selected.

Meanwhile, in the CS/CB scheme, CoMP cooperation units may cooperatively perform beamforming for data transmission to a single UE. While data is transmitted to the UE only from a serving cell, user scheduling/beamforming may be determined through coordination of cells of the CoMP cooperation units.

In the case of uplink, CoMP reception refers to reception of a signal transmitted through cooperation among a plurality of geographically separated transmission points. CoMP schemes applicable to uplink may be classified into joint reception (JR) and coordinated scheduling/beamforming (CS/CB).

The JR scheme indicates that a plurality of reception points receives a signal transmitted through a PUSCH. The CS/CB scheme indicates that only one point receives a PUSCH, and user scheduling/beamforming is determined by coordination of the cells of the CoMP unit.

With a CoMP system as above, multi-cell base stations may jointly support data for a UE. In addition, the base stations may simultaneously support one or more UEs using the same radio frequency resources, thereby increasing system performance. Moreover, a base station may perform space division multiple access (SDMA) based on CSI between the UE and the base station.

In the CoMP system, a serving eNB and one or more cooperative eNBs are connected to a scheduler over a backbone network. The scheduler may receive channel information about the channel states between each UE and cooperative eNBs measured and fed back by the cooperative eNBs over the backbone network, and operate based on the channel information. For example, the scheduler may schedule information for a cooperative MIMO operation for the serving eNB and the one or more cooperative eNBs. That is, the scheduler may directly give each eNB a command to perform the cooperative MIMO operation.

As noted from the above description, it can be said that the CoMP system operates as a virtual MIMO system by grouping a plurality of cells into one group. Basically, the CoMP system may adopt a MIMO communication scheme employing multiple antennas.

FIG. 11 illustrates a CoMP cluster. A CoMP cluster refers to a CoMP cooperation unit mentioned above. FIG. 11(a) illustrates a case in which cells in a CoMP cluster use different physical cell IDs (PCIDs), and FIG. 11(b) illustrates a case in which cells in a CoMP cluster use the same PCID. Even in the case that the cells use the same PCID in a CoMP cluster, the CoMP clusters (CoMP clusters A, B in FIG. 11(b)) may use different PCIDs, and the cells in a single cluster may be configured in the form of a distributed antenna of an eNB or an RRH by sharing a PCID. In a variation, some of the cells in a cluster may share a PCID.

If the cells share the PCID, all the cells having the same PCID may transmit a common signal such as a primary synchronization signal (PSS)/secondary synchronization signal (SSS), a CRS, a PBCH, or a CRS-based PDCCH/PDSCH at the same time. Thereby improving quality of received signals and removing the communication shadow area. Alternatively, some cells having higher transmission power than may transmit a common signal among the cells having the same PCID, and the other cells may not transmit a common signal. However, in the case of unicast data transmission through a CSI-RS, a UE-specific RS and a UE-specific RS-based PDSCH, each cell may individually perform transmission, and have a cell splitting gain.

CSI Reporting for CoMP

To select a proper transmission technique from among CoMP transmission techniques described above, a network needs to receive CSI feedback from a UE. To this end, CSI feedback configurations assuming various CoMP situations may be set for the UE. Exemplary CSI feedback configurations are shown in Table 5 below.

CSI feedback configuration 2 defines CSI($RI_2$/$PMI_2$/$CQI_2$) to be measured and reported in the case in which the UE receives a desired signal from TP 1 and no interference signal from TP 2. CSI feedback configurations 2 may be for dynamic point blank (DPB) among the CoMP transmission techniques.

CSI feedback configurations 3 and 4 correspond to a case in which the UE receives a desired signal from TP 2.

CSI feedback configuration 5 is related to a case in which the UE (simultaneously) receives desired signals from TPs 1 and 2. CSI feedback configuration 5 may be for joint transmission (JT) among the CoMP transmission techniques.

As described above, various CoMP operations may be performed based on channel information exemplarily shown in Table 5. In the case in which channel information is given according to CSI feedback configurations 1 and 2 by the UE, the network may determine a proper CoMP operation of CS/CB or DPB and cause TP 1 to transmit a signal desired by the UE. In the case in which channel information is given according to CSI feedback configurations 3 and 4 in addition to CSI feedback configurations 1 and 2, the network may determine a proper CoMP operation of CS/CB or DPS/DPB and transmit a desired signal selectively by TP 1 or TP 2. Further, in the case in which channel information is given according to CSI feedback configurations 1 to 4 and CSI feedback configuration 5, the network may perform the JT operation to cause TP 1 and TP 2 to simultaneously transmit desired signals to the UE. In the case in which the network sets all the possible CSI feedback configurations for the UE, the network may perform all CoMP operations including

TABLE 5

| Feedback configuration | Feedback contents | Computed Feedback | CoMP Hypothesis | Desired signal hypothesis TP1 | Desired signal hypothesis TP2 | Interference signal hypothesis TP1 | Interference signal hypothesis TP2 |
|---|---|---|---|---|---|---|---|
| CSI feedback configuration 1 | $RI_1$/$PMI_1$/$CQI_1$ | $RI_1$/$PMI_1$/$CQI_1$ | Hypothesis 1 | On | Off | Off | On |
| CSI feedback configuration 2 | $RI_2$/$PMI_2$/$CQI_2$ | $RI_2$/$PMI_2$/$CQI_2$ | Hypothesis 2 | On | Off | Off | Off |
| CSI feedback configuration 3 | $RI_3$/$PMI_3$/$CQI_3$ | $RI_3$/$PMI_3$/$CQI_3$ | Hypothesis 3 | Off | On | On | Off |
| CSI feedback configuration 4 | $RI_4$/$PMI_4$/$CQI_4$ | $RI_4$/$PMI_4$/$CQI_4$ | Hypothesis 4 | Off | On | Off | Off |
| CSI feedback configuration 5 | $RI_5$/$PMI_5$(for TP1)/$PMI_6$(for TP2)/$CQI_5$ | $RI_5$/$PMI_5$(for TP1)/$PMI_6$(for TP2)/$CQI_5$ | Hypothesis 5 | On | On | Off | Off |

Figure 12:
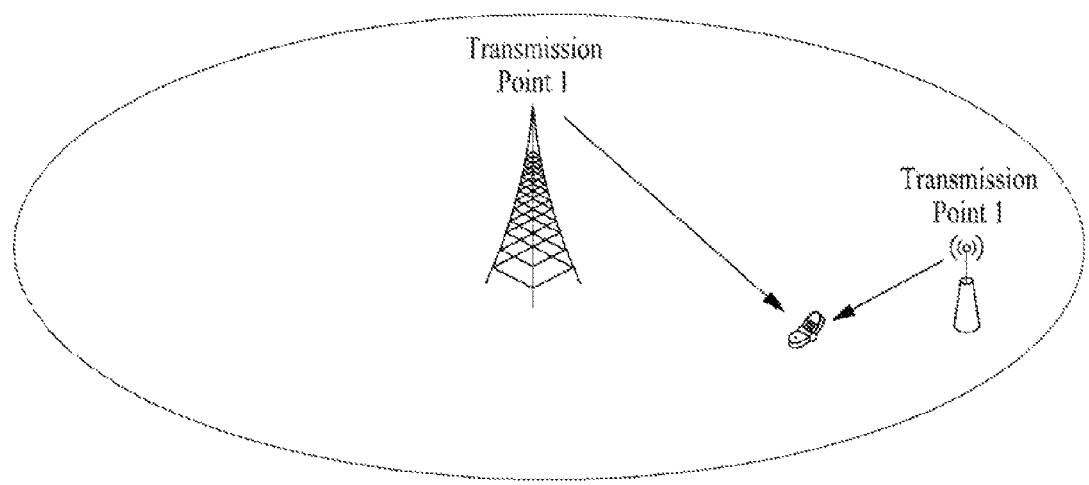
FIG. 12 illustrates an embodiment of the present invention.

Table 5 shows computed feedbacks which are CSI the UE needs to measure and feedback contents which the UE needs to report for the respective CSI feedback configurations in a situation allowing two transmission points (TP 1 and TP 2) to cooperate in various ways as show in FIG. 12.

Hereinafter, each CSI feedback configuration will be described in detail. CSI feedback configuration 1 defines CSI ($RI_1$/$PMI_1$/$CQI_1$) to be measured and reported in the case in which the UE receives a desired signal from TP 1 and an interference signal from TP 2. CSI feedback configuration 1 may be related to dynamic cell selection/dynamic point selection (DPS) described above. More specifically, to use DPS among CoMP transmission techniques in a situation as shown in FIG. 12, the network needs to know the degree of interference that TP 2 applies to a UE receiving a signal from TP 1. When the UE reports CSI according to CSI feedback configuration 1, the network may acquire the information related to the degree of interference.

CS/CB, DPS/DPB, and JT. In the case in which the network sets only some of the possible CSI feedback configurations, the network may select CoMP operations assumed by the CSI feedback configurations.

In this case, however, the amount of information the UE needs to feed back to allow the network to perform selection of a CoMP operation may increase, becoming a burden to the UE. For example, in the case in which two transmission points cooperate, the UE needs to feed back channel information corresponding to all five CSI feedback configurations to support the CoMP operations such as CS/CB, DPS/DPB, and JT. Particularly, to support the JT operation, the two TPs need to have PMI information, and thus two PMI values need to be transmitted for CSI feedback configuration 5. That is, since five RI values, six PMI values, and five CQI values should be transmitted, and thus high overhead may be caused to the PUCCH. Hereinafter, embodiments for reducing the amount of channel information to be fed back in consideration of uplink overhead will be described.

Embodiment 1

Embodiment 1 relates to a method for reducing the amount of CSI feedback for CoMP through proper approximation.

Referring back to Table 5 and the descriptions given above, the difference between $RI_1/PMI_1/CQI_1$ for CSI feedback configuration 1 and $RI_2/PMI_2/CQI_2$ for CSI feedback configuration 2 is presence or absence of interference from TP 2. The values of RI/PMI determined by the channel state between the UE and TP 1 little differ between the two configurations, but the value of CQI which is significantly affected by the amount of interference may greatly differ between the configurations. Accordingly, if the network and the UE pre-agree that $RI_2$ is approximated by $RI_1$, and $PMI_2$ is approximated by $PMI_1$, the UE can omit implementation of feedback of $RI_2/PMI_2$ information, and thus feedback overhead may be reduced. Similarly, in case of CSI feedback configurations 4, $RI_4$ may be approximated by $RI_3$, $PMI_4$ may be approximated by $PMI_3$.

Table 6 below shows an example of feedback configurations obtained by applying such approximation.

Referring back to Table 6, in the case of CSI feedback configuration 1, values of RI/PMI/CQI are calculated and fed back, assuming a CoMP operation in which the UE receives a desired signal from TP 1 and an interference signal from TP 2. In this case, if RI has a value greater than 1, it may be understood as meaning that the channel between the UE and TP 2 is not good and thus signals from TP 2 are ignorable. Accordingly, the performance of the CoMP operation may be not significantly affected even if $CQI_2$ (CQI in the case in which a CoMP operation without receiving an interference signal from TP 2 is assumed) is not transmitted/reported. That is, if $RI_1>1$, the UE reports only $RI_1/PMI_1/$ ($CQI_1^{(1)}$ & $CQI_1^{(2)}$), which are information necessary for multi-layer transmission from TP 1.

If $RI_1=1$, it may mean that a signal from TP 2 is not ignorable. Accordingly, DPS may be performed as a CoMP operation to prevent interference signals from TP 2. In this case, the UE preferably reports a $CQI_2^{(1)}$ value as a value of CQI (assuming RI=1). The network may interpret the interference situation assumed for each of $CQI^{(1)}$ and $CQI^{(2)}$ according to the value of RI. In the two cases (i.e., RI>1, RI=1), the amount of information finally fed back by the UE corresponds to one RI information, one PMI value and one CQI value, and thus only CSI feedback configuration 1 in

TABLE 6

| Feedback configuration | Feedback contents | Computed Feedback | CoMP Hypothesis | Desired signal hypothesis | | Interference signal hypothesis | |
|---|---|---|---|---|---|---|---|
| | | | | TP1 | TP2 | TP1 | TP2 |
| CSI feedback configuration 1 | $RI_1/PMI_1/CQI_1$ | $RI_1/PMI_1/CQI_1$ | Hypothesis 1 | On | Off | Off | On |
| CSI feedback configuration 2 | $CQI_2$ | $RI_2/PMI_2/CQI_2$ | Hypothesis 2 | On | Off | Off | Off |
| CSI feedback configuration 3 | $RI_3/PMI_3/CQI_3$ | $RI_3/PMI_3/CQI_3$ | Hypothesis 3 | Off | On | On | Off |
| CSI feedback configuration 4 | $CQI_4$ | $RI_4/PMI_4/CQI_4$ | Hypothesis 4 | Off | On | Off | Off |

Embodiment 2

The amount of CSI feedback may be reduced when the feedback contents, which are information to be fed back, are determined according to RI.

Table 7 below may be set. Similarly, in the case in which TP 2 transmits a desired signal to the UE, CSI feedback configurations 2 may be set, and therefore the UE may report channel information necessary for a situation of cooperation between two TPs through two CSI feedback configurations in total.

TABLE 7

| Feedback configuration | | Feedback contents | Computed Feedback | CoMP Hypothesis | Desired signal hypothesis | | Interference signal hypothesis | |
|---|---|---|---|---|---|---|---|---|
| | | | | | TP1 | TP2 | TP1 | TP2 |
| CSI feedback configuration 1 | If $RI_1 > 1$, | $RI_1/PMI_1/$ ($CQI_1^{(1)}$ & $CQI_1^{(2)}$) | $RI_1/PMI_1/CQI_1$ | Hypothesis 1 | On | Off | Off | On |
| | If $RI_1 = 1$ | $RI_1/PMI_1/$ ($CQI_1^{(1)}$ & $CQI_2^{(1)}$) | $RI_2/PMI_2/CQI_2$ | Hypothesis 2 | On | Off | Off | Off |
| CSI feedback configuration 2 | If $RI_3 > 1$, | $RI_3/PMI_3/$ ($CQI_3^{(1)}$ & $CQI_3^{(2)}$) | $RI_3/PMI_3/CQI_3$ | Hypothesis 3 | Off | On | On | Off |
| | If $RI_3 = 1$ | $RI_3/PMI_3/$ ($CQI_3^{(1)}$ & $CQI_4^{(1)}$) | $RI_4/PMI_4/CQI_4$ | Hypothesis 4 | Off | On | Off | Off |

Table 8 below shows configurations obtained by applying RI approximation and PMI approximation, described in Embodiment 1, to the Computed Feedback of FIG. 7. In this case, the UE may reduce the amount of calculation for $RI_2/PMI_2$ in each CSI feedback configuration.

TABLE 8

| Feedback configuration | | Feedback contents | Computed Feedback | CoMP Hypothesis | Desired signal hypothesis | | Interference signal hypothesis | |
|---|---|---|---|---|---|---|---|---|
| | | | | | TP1 | TP2 | TP1 | TP2 |
| CSI feedback configuration 1 | If $RI_1 > 1$, | $RI_1/PMI_1/$ $(CQI_1^{(1)}$ & $CQI_1^{(2)})$ | $RI_1/PMI_1/CQI_1$ | Hypothesis 1 | On | Off | Off | On |
| | If $RI_1 = 1$ | $RI_1/PMI_1/$ $(CQI_1^{(1)}$ & $CQI_2^{(1)})$ | $RI_1/PMI_1/CQI_2$ | Hypothesis 2 | On | Off | Off | Off |
| CSI feedback configuration 2 | If $RI_3 > 1$, | $RI_3/PMI_3/$ $(CQI_3^{(1)}$ & $CQI_3^{(2)})$ | $RI_3/PMI_3/CQI_3$ | Hypothesis 3 | Off | On | On | Off |
| | If $RI_3 = 1$ | $RI_3/PMI_3/$ $(CQI_3^{(1)}$ & $CQI_4^{(1)})$ | $RI_3/PMI_3/CQI_4$ | Hypothesis 4 | Off | On | Off | Off |

In Embodiment 1 and Embodiment 2, multiple non-zero power (NZP) CSI-RS resources and zero-power (ZP) CSI-RS resources may be used in calculating CSI according to CSI feedback configurations. Herein, the ZP CSI-RS resource may be referred to as an interference measurement resource (IMR) and indicated by a CSI-RS resource configuration. The NZP CSI-RS resource may be referred to as a signal measurement resource (SMR) and indicated by a CSI-interference measurement (CSI-IM) resource configuration (the IMR may employ an NZP CSI-RS resource. In the case in which an NZP CSI-RS resource is used as an IMR, a desired signal may be calculated using the NZP CSI-RS resource, and then a value obtained by removing the desired signal from the original signal may be defined as the interference).

Hereinafter, the embodiments discussed above will be reviewed in terms of SMR and IMR. In the cases of CoMP hypotheses 1 and 2, each of which represents a case in which the UE receives a desired signal from TP1 and an interference signal is or is not received from TP 2, the network may set an NZP CSI-RS resource configured in TP1 as SMR1 and inform the UE of the same to allow the UE to calculate a desired signal. The network may also set two different interference situations created by controlling TP1 and TP2 as IMR1 and IMR2 and inform the UE of the same to allow the UE to calculate the interference. In other words, in the case of IMR1, TP1 is set to transmit nothing through the ZP CSI-RS resource configuration, and TP2 is set to transmit a signal. In the case of IMR2, both TP1 and TP2 may be set to transmit nothing through the ZP CSI-RS resource configuration. The network may configure SMR1 and IMR1 and inform the UE of the same to allow the UE to calculate $RI_1/PMI_1/CQI_1$ corresponding to CoMP hypothesis 1, and may configure SMR1 and IMR2 and inform the UE of the same to allow the UE to calculate $RI_2/PMI_2/CQI_2$ corresponding to CoMP hypothesis 2. In the same manner, the network may associate SMR2 (an NZP CSI-RS resource transmitted from TP2) with two IMRs (IMR1 and IMR2) according to situations, i.e., CoMP hypotheses 3 and 4 to allow the UE to calculate $RI_3/PMI_3/CQI_3$, $RI_4/PMI_4/CQI_4$.

More specifically, in the cases of Tables 7 and 8 in which information to be fed back is determined according to RI, $CQI_1$ and $CQI_2$ constituting CQI information according to RI in CSI feedback configuration 1 may be values calculated from different combination of an SMR and an IMR. More specifically, if $RI_1>1$, CQI information includes two values of $CQI_1^{(1)}$ and $CQI_1^{(2)}$. In this case, both the $CQI_1^{(1)}$ value and the $CQI_1^{(2)}$ value may be calculated from SMR1 and IMR1. On the other hand, if $RI_1=1$, the values of $CQI_1^{(1)}$ and $CQI_2^{(1)}$ constitute CQI information, but the $CQI_1^{(1)}$ value may be calculated from SMR1 and IMR1, and the $CQI_2^{(1)}$ value may be calculated from SMR1 and IMR2.

That is, even if channel information is reported through one CSI feedback configuration, a plurality of SMRs and IMRs may be configured for the UE, and a combination of an SMR and an IMR configured for the UE may vary depending on the RI value. The network and the UE pre-agree on a combination of an SMR and an IMR and a corresponding CoMP operation.

This may mean that a plurality of IMR sets associated with a specific SMR is UE-specifically configured. That is, the UE may receive a specific SMR configuration and a plurality of IMR sets (e.g., IMR1, IMR2, etc.) associated with the specific SMR configuration. The UE may calculate and feed back the CQI based on a specific combination of an SMR and an IMR according to the RI value in a specific CSI feedback configuration.

Figure 13:
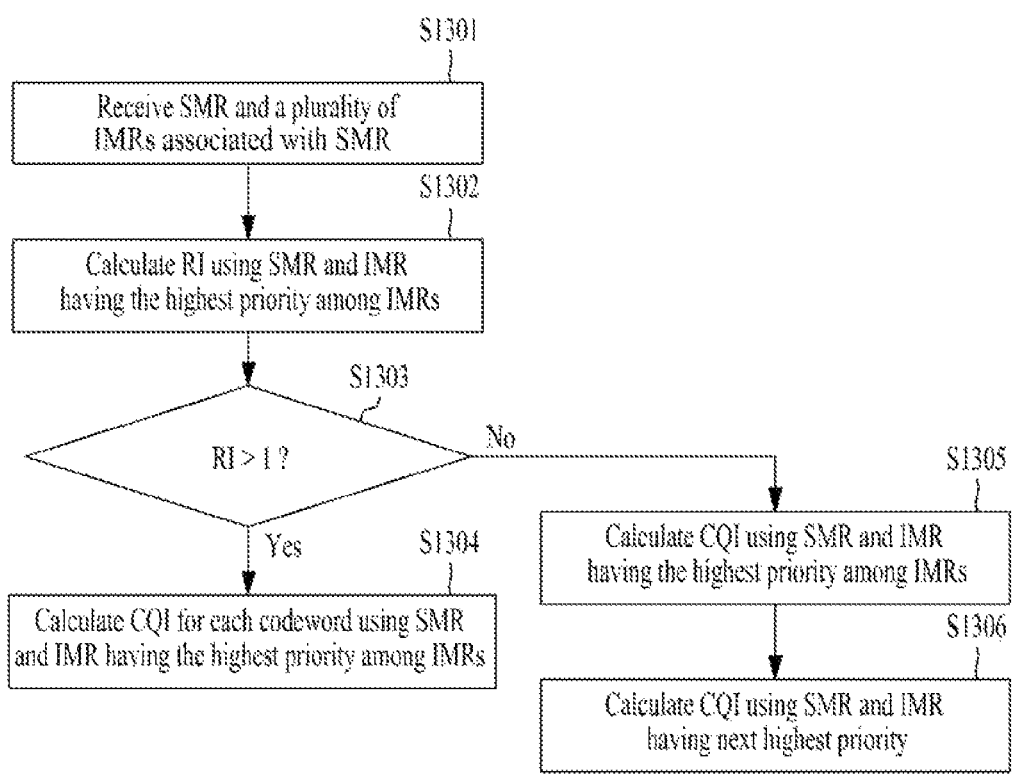
FIG. 13 is a flowchart illustrating a method for reporting channel state information by a user equipment according to one embodiment of the present invention.
Figure 14:
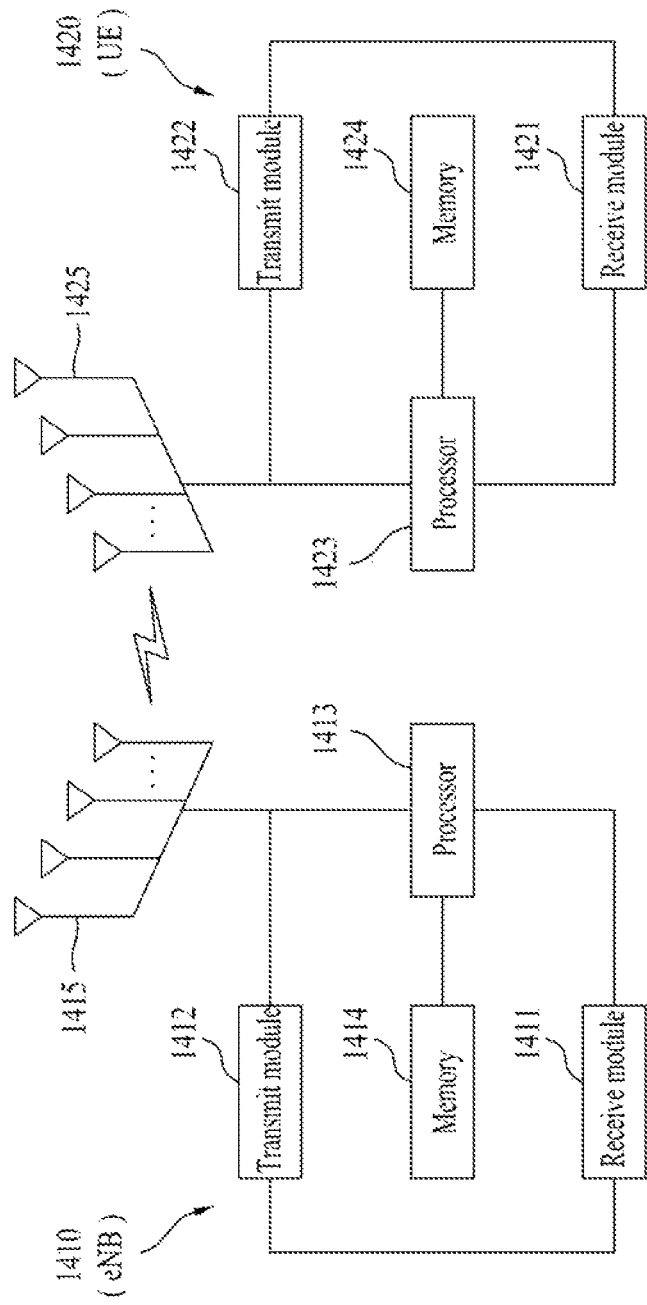
FIG. 14 is a diagram illustrating configurations of transceivers.

Priorities may be established among multiple IMR configurations associated with a specific SMR configuration. Hereinafter, channel state reporting by the UE under this condition will be described with reference to FIG. 13.

In step S1301, an SMR and a plurality of IMRs associated with the SMR may be configured for (received by) the UE. In step S1302, the UE may calculate RI using an IMR having the highest priority among the IMRs and the SMR (hereinafter, the IMR having the highest priority will be referred to as IMR1, and an IMR having the next highest priority will be referred to as IMR2). In step S1303, the UE may check whether RI is greater than 1, and if RI is greater than 1, the UE may calculate CQI for each codeword using the SMR and IMR1 in step S1304. Then, the UE may feed back the calculated CQIs ($CQI_1^{(1)}$ and $CQI_1^{(2)}$) for the codewords. Herein, the CQI for codeword 0 may be fed back with 4 bits, and the CQI for codeword 1 may be fed back with 3 bits. Subsequently, if RI is 1, the UE may calculate a CQI ($CQI_1^{(1)}$) using the SMR and $IMR_1$ in step S1305. In addition, the UE may calculate a CQI ($CQI_2^{(1)}$) using the SMR and an IMR having the next highest priority, i.e., IMR 2 in step S1306. Herein, the CQI calculated using IMR 2 may be fed back with 3 bits together with the CQI calculated using IMR1 as in feeding back of the CQIs for two codewords in step S1304.

Which of Embodiment 1 and Embodiment 2 is used to reduce the amount of feedback information may be pre-agreed between the network and the UE or may be semi-statically set through RRC signaling.

FIG. 12 is a diagram illustrating configurations of an eNB and a UE according to one embodiment of the present invention.

Referring to FIG. 12, an eNB 1210 may include a receive module 1211, a transmit module 1212, a processor 1212, a memory 1214, and a plurality of antennas 1215. The antennas 1215 represent an eNB that supports MIMO transmission and reception. The receive module 1211 may receive various signals, data and information from a UE on uplink. The transmit module 1212 may transmit various signals, data and information to a UE on downlink. The processor 1212 may control overall operation of the eNB 1210.

The processor 1212 of the eNB 1210 according to one embodiment of the present invention may operate to implement the embodiments described above.

Additionally, the processor 1212 of the eNB 1210 may function to operationally process information received by the eNB 1210 or information to be transmitted from the eNB 1210, and the memory 1214, which may be replaced with an element such as a buffer (not shown), may store the processed information for a predetermined time.

Referring to FIG. 12, a UE 1220 may include a receive module 1221, a transmit module 1222, a processor 1223, a memory 1224, and a plurality of antennas 1225. The antennas 1225 represent a UE that supports MIMO transmission and reception. The receive module 1221 may receive various signals, data and information from the eNB on downlink. The transmit module 1222 may transmit various signals, data and information to the eNB on uplink. The processor 1223 may control overall operation of the UE 1220.

The processor 1223 of the UE 1220 according to one embodiment of the present invention may perform operations necessary for implementation of the embodiments described above.

Additionally, the processor 1223 of the UE 1220 may function to operationally process information received by the UE 1220 or information to be transmitted from the UE 1220, and the memory 1224, which may be replaced with an element such as a buffer (not shown), may store the processed information for a predetermined time.

The configurations of the eNB and the UE as described above may be implemented such that the above-described embodiments are independently applied or two or more thereof are simultaneously applied, and description of redundant parts is omitted for clarity.

Description of the eNB 1210 in FIG. 12 may be equally applied to a relay as a downlink transmitter or an uplink receiver, and description of the UE 1220 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention as described above are applicable to various mobile communication systems.

The invention claimed is:

1. A method for reporting channel state information by a user equipment in a wireless communication system, comprising:
calculating at least one channel quality information from a combination of a signal measurement resource configuration and a plurality of interference measurement resource configurations associated with the signal measurement resource configuration; and
transmitting a channel state report containing the calculated channel quality information,
wherein the combination of the signal measurement resource configuration and the interference measurement resource configurations is determined according to a value of a rank indicator,
wherein, if the value of the rank indicator is greater than 1, each of the at least one channel quality information is based on the same combination of the signal measurement resource configuration and the interference measurement resource configurations; and wherein, if the value of the rank indicator is 1, each of the at least one channel quality information is based on a different combination of the signal measurement resource configuration and the interference measurement resource configurations.

2. The method according to claim 1, wherein the signal measurement resource configuration and the plurality of interference measurement resource configurations correspond to one channel state information feedback configuration.

3. The method according to claim 1, wherein association between the signal measurement resource configuration and the plurality of interference measurement resource configurations is used only for the user equipment.

4. The method according to claim 1, wherein:
the signal measurement resource configuration is for transmission of a signal from one of a first transmission point and a second transmission point, the first transmission point and the second transmission point belonging to a coordinated multi point (CoMP) cluster; and
the plurality of interference measurement resource configurations is related to presence or absence of interference from one transmission point not transmitting the signal among the first transmission point and the second transmission point.

5. The method according to claim 1, wherein priorities are set for the plurality of interference measurement resource configurations.

6. The method according to claim 5, wherein calculating the at least one channel quality information comprises:
calculating the rank indicator using the signal measurement resource configuration and an interference measurement resource configuration having a highest priority among the priorities that are set for the plurality of interference measurement resource configurations.

7. The method according to claim 6, wherein, if the rank indicator is greater than 1, the user equipment calculates channel quality information for each codeword from the signal measurement resource configuration and the interference measurement resource configuration having the highest priority.

8. The method according to claim 6, wherein, if the rank indicator is 1, the user equipment calculates a channel quality information from the signal measurement resource configuration and the interference measurement resource configuration having the highest priority, and calculates a second channel quality information from the signal measurement resource configuration and an interference measurement resource configuration having next highest priority after the interference measurement resource configuration having the highest priority.

9. The method according to claim 1, wherein the signal measurement resource configuration is related to a non-zero power channel state information-reference signal (CSI-RS) resource, and the interference measurement resource configurations are related to a zero power CSI-RS resource.

10. The method according to claim 1, wherein the signal measurement resource configuration is a channel state information-reference signal (CSI-RS) resource configuration, and the interference measurement resource configurations are channel state information-interference measurement (CSI-IM) resource configurations.

11. A user equipment in a wireless communication system, comprising:
a receive module; and
a processor,
wherein the processor calculates at least one channel quality information from a combination of a signal measurement resource configuration and a plurality of interference measurement resource configurations associated with the signal measurement resource configuration, and transmits a channel state report containing the calculated channel quality information,
wherein the combination of the signal measurement resource configuration and the interference measurement resource configurations is determined according to a value of a rank indicator,
wherein, if the value of the rank indicator is greater than 1, each of the at least one channel quality information is based on the same combination of the signal measurement resource configuration and the interference measurement resource configurations; and
wherein, if the value of the rank indicator is 1, each of the at least one channel quality information is based on a different combination of the signal measurement resource configuration and the interference measurement resource configurations.

* * * * *